(12) United States Patent
Hamid

(10) Patent No.: US 8,291,503 B2
(45) Date of Patent: Oct. 16, 2012

(54) PRELOADING MODULES FOR PERFORMANCE IMPROVEMENTS

(75) Inventor: Zeeshan Hamid, Milton (CA)

(73) Assignee: Microsoft Corporation, Redmond, WA (US)

( * ) Notice: Subject to any disclaimer, the term of this patent is extended or adjusted under 35 U.S.C. 154(b) by 685 days.

(21) Appl. No.: 12/478,788

(22) Filed: Jun. 5, 2009

(65) Prior Publication Data

US 2010/0313002 A1 Dec. 9, 2010

(51) Int. Cl.
*G06F 9/44* (2006.01)
*G06F 7/00* (2006.01)

(52) U.S. Cl. .................................. 726/26; 712/248
(58) Field of Classification Search .................. 712/248; 726/26
See application file for complete search history.

(56) References Cited

U.S. PATENT DOCUMENTS

| 5,978,841 | A | 11/1999 | Berger |
| 6,182,133 | B1 | 1/2001 | Horvitz |
| 6,910,106 | B2 * | 6/2005 | Sechrest et al. ............... 711/136 |
| 6,959,436 | B2 | 10/2005 | Peng |
| 2003/0220984 | A1 | 11/2003 | Jones et al. |
| 2004/0068627 | A1 * | 4/2004 | Sechrest et al. ............... 711/158 |
| 2008/0201332 | A1 * | 8/2008 | Souders et al. ................. 707/10 |

FOREIGN PATENT DOCUMENTS

WO WO02/17080 A2 * 2/2002

OTHER PUBLICATIONS

"5-Minute Security Advisor—Configuring Your Computer for Multiple Users", http://technet.microsoft.com/en-us/library/cc722655.aspx, Microsoft|TechNet, May 7, 2002, 4 pages.*
Walkthrough: Creating an MRU Menu List (http://msdn.microsoft.com/en-us/library/bb165112, Visual Studio 2005, Microsoft Developer Network, 10 pages).*
Yuson Philip, "mod_perl Handlers: Pre-Loading Modules", Retrieved at<<http://www.suite101.com/article.cfm/perl/100923>>, May 27, 2003, pp. 2.
Park Stan, "Fault-tolerant N-Tiered Distributed Operating Systems for AI Integration", Retrieved at<<http://www.cs.rochester.edu/~park/ITRG_proposal.pdf>>, pp. 3.
"OpenOffice.org 2.0.4 for eComStation and OS/2", Retrieved at<<http://www.ecomstation.com/openoffice2/releasenotes.phtml>>, pp. 7.

(Continued)

*Primary Examiner* — James D Nigh
(74) *Attorney, Agent, or Firm* — Gonzalez Saggio & Harlan LLP

(57) ABSTRACT

Described is a technology for preloading modules, such as modules that show clinical/medical data maintained at a service, so as to reduce a user's wait time to use a module. The modules for which a user is authenticated are preloaded according to a loading order that is based upon the user's historical usage data. If a user interacts to use a selected module that is not yet loaded, the selected module may be loaded immediately, independent of the order. A background thread preloads the modules according to the order. A normal thread loads the selected module, unless already being preloaded by the background thread; in either situation the loading thread's priority may be temporarily increased to expedite loading. The historical data may be in the form of weight values associated with the modules, with the weight values adjusted based upon module usage.

20 Claims, 4 Drawing Sheets

OTHER PUBLICATIONS

"Tweak Ubuntu Boot Speed and Application Startup Time with Preload", Retrieved at<<http://www.ubuntu-unleashed.com/search/label/Preload%20and%20prefetch%20applications>>, pp. 7.

"Optimizing Perceived Speed", Retrieved at<<http://msdn.microsoft.com/en-us/library/aa263516.aspx>>, pp. 3.

"Module Initialization Order", Retrieved at<<http://burks.bton.ac.uk/burks/language/modula2/m2refman/node224.htm>>, p. 1.

* cited by examiner

PRELOADING MODULES FOR PERFORMANCE IMPROVEMENTS

BACKGROUND

The amount of clinical data including medical records for patients can be vast. Microsoft Amalga® is a Unified Intelligence System/service that provides users access to such data. This data is exposed via different modules that are hosted inside Amalga®, e.g., there is an image viewing module for viewing x-ray images and the like.

Because of privacy considerations, users are limited to accessing only modules for which they are authenticated. Similarly, users can only see certain data, e.g., only a patient's doctor may have access to that patient's data.

When a user wants to see/use a module, users select that module and it gets loaded onto a module pane for viewing via a client-side user interface. However, some of the modules can take a relatively long time to load, e.g., on the order of tens of seconds. Moreover, sometimes modules need a large amount of data, which can also take a take a relatively long time to load. Such long loading times create a very poor user experience. At the same time, local or advance caching is not permitted because of privacy considerations.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which the modules that a user is authenticated to use are loaded according to a loading order that is based upon historical data indicative of that user's usage of the modules. Upon detecting user interaction that indicates an intent to use a selected module, the selected module may be loaded independent of the order, e.g., right away.

In one aspect, if the selected module is not already loaded and is not currently being loaded via the background thread, the selected module is loaded with another thread having an increased thread priority. If instead the selected module is currently being loaded via the background thread, the thread priority of the background thread is increased. Once loaded, regardless of which thread was used, the thread priority is restored to its previous priority.

In one implementation the historical data is in the form of a weight value associated with each module to be loaded. The weight value associated with a module is adjusted based upon usage of that module.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards preloading the subset of modules that a user is authenticated to use, in an order that is determined based upon the user's past usage history (when available), and also based upon any user interaction that corresponds to selecting a module (or modules). In one implementation, the user's modules are loaded in a background thread that manages its priority based on any user interaction. If a usage pattern history is available, the modules load based on each module's priority. If the user interacts to select a module, the module with which the user is interacting loads first. In the event that no history is available, e.g., when the user first starts using the system, the subset of modules for that user is preloaded in a defined order, unless the user starts interacting to select a module.

It should be understood that any of the examples herein are non-limiting. Indeed, as one example, the preloading technology described herein may be used for loading any (e.g., Internet) content, not only clinical modules and data. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing in general.

Figure 1:
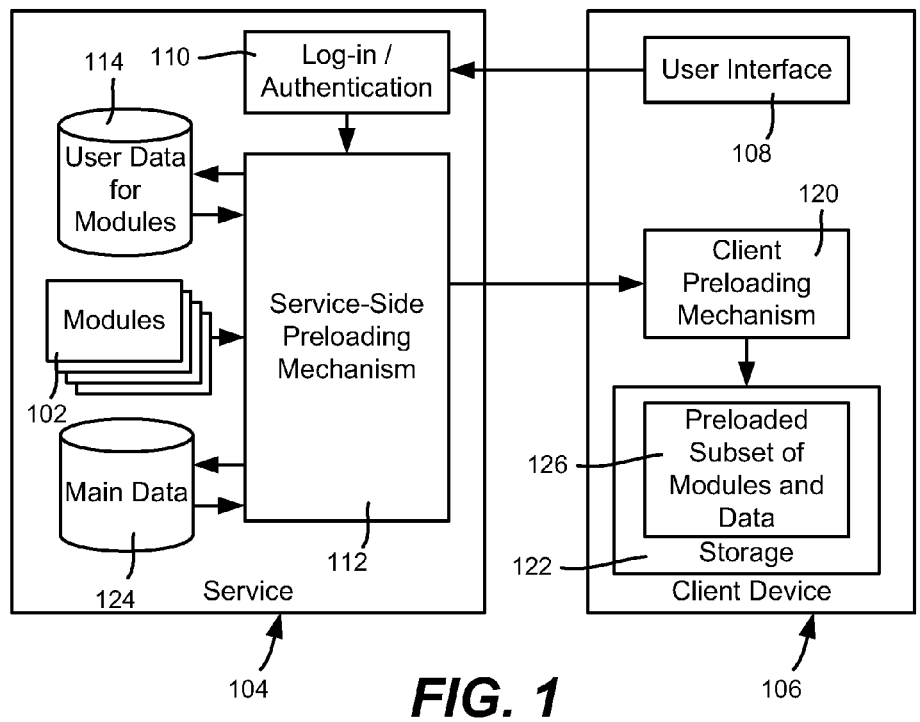
FIG. 1 is a block diagram representing example components for preloading modules for use in viewing data.

Turning to FIG. 1, there is shown a block diagram representing example components for preloading (a subset of) modules 102 maintained at a service 104 into a client computing device 106. In general, via a suitable user interface, 108, a user logs in and authenticates with and appropriate component 110 of the service 104. When the user is authenticated and known to the service, a service-side preloading mechanism 112 (or other suitable component coupled thereto) is able to look up information regarding that user in a data store 114.

Note that with such a privacy-controlled service/system, the user has to first log on before the system knows which modules the user is allowed to access, and thus preloading has to wait for user authentication. Further, as described herein, the service allows the user to select any module desired, in any order, which does not necessarily correspond to the preloading order. To handle such a selection, a mechanism is described for managing thread priority to change the loading order. In one implementation, there are two threads, namely a normal thread that typically runs at a normal priority level to handle user actions, and a background thread that typically runs at a low priority level to preload the modules. However, if a user interacts to select a module that is not yet loaded, the normal thread is increased to high priority to quickly load that module. Similarly, if a user interacts to select a module that is currently background loading via the background thread, the background thread is increased to high priority to quickly load that module. In either scenario, once the module is loaded, each such thread is restored from high priority to its previous priority.

Among the information maintained in the data store 114 is a subset of modules (of all available modules) that the user is allowed to access. Note that the subset may be the entire set of available modules, but for a given user may be less than the entire set.

Moreover, as described below, historical information regarding each user's usage pattern of those modules is maintained. In one implementation, this historical information is in the form of a priority weight associated with (e.g., via a preload_priority column in the data store) each module of the subset, which may be arranged as a list of modules. Note that in the examples herein, the higher weighted priority is preloaded first, and thus as used herein "weight" and "priority" are the same with respect to determining a loading order; however, this is not to be confused with thread priority. As can be readily appreciated, other schemes are feasible, e.g., a "lower" priority-first type model may be used. Also note that "preloading" generally refers to loading a module before a user indicates a need for it, however "preloading" and "loading" and their variations as used herein are equivalent concepts, e.g., a module may be loaded from the preloading list, the pre-loading list may be modified by user interaction with a module such that the interacted-with module is loaded first, and so forth.

Initially, modules are listed in the order in which they are stored in the database and preloaded in this order, because all modules start off with the same priority, e.g., a priority weight of one (1) when a new user is created. As a user develops a usage history, the weights are adjusted as generally described below, and the user's list re-sorted by the priority weights.

As described below, this historical usage information is used to preload the modules into the client device in a particular order so that in general, the modules that the user works with most often are preloaded first. As also described below, the loading order can be changed based upon user interaction with a given module.

To this end, as represented in FIG. 1, a client preloading mechanism 120 (also referred to as a module launcher) communicates with the service-side preloading mechanism 112 to look up and obtain the subset of modules to load for this user, which are loaded into a suitable storage 122 (RAM where possible) when received.

Also shown in FIG. 1 is the main data 124 for viewing and interacting with as appropriate for each module and user. Thus, the client device 106 will ordinarily contain the modules and data 126 (or at least some of the data at a time) as appropriate for the current user.

In general, when the client preloading mechanism 120 runs, it requests and obtains the list (subset) of the modules that the user is authorized to use. The client preloading mechanism 120 then spawns a low priority background thread that loads these modules in the order in which they are defined. In one implementation, the mechanism 120 also checks whether a 'pre-initialize' function is defined in the newly preloaded module; if it is, then this function is called. For example a pre-initialize function (e.g., API) may be called that tells a module to initialize itself in a preloading scenario, such as to perform needed computations, but leave rendering/painting for a later time when needed.

As mentioned above, if at any point the user clicks a module (e.g., an icon representative of that module) that is currently preloading, then the preloading background thread priority gets increased (e.g., to high) so that the module preloads faster; once loaded, the preloading thread priority gets reset.

Note that visual indicators on the user interface may be present that show when a module is not loaded, is fully loaded or is in the process of being loaded. If the user clicks on a module that is not being preloaded, then that new module loads normally while preloading continues. This interrupt functionality in preloading significantly improves the user experience.

Figure 2:
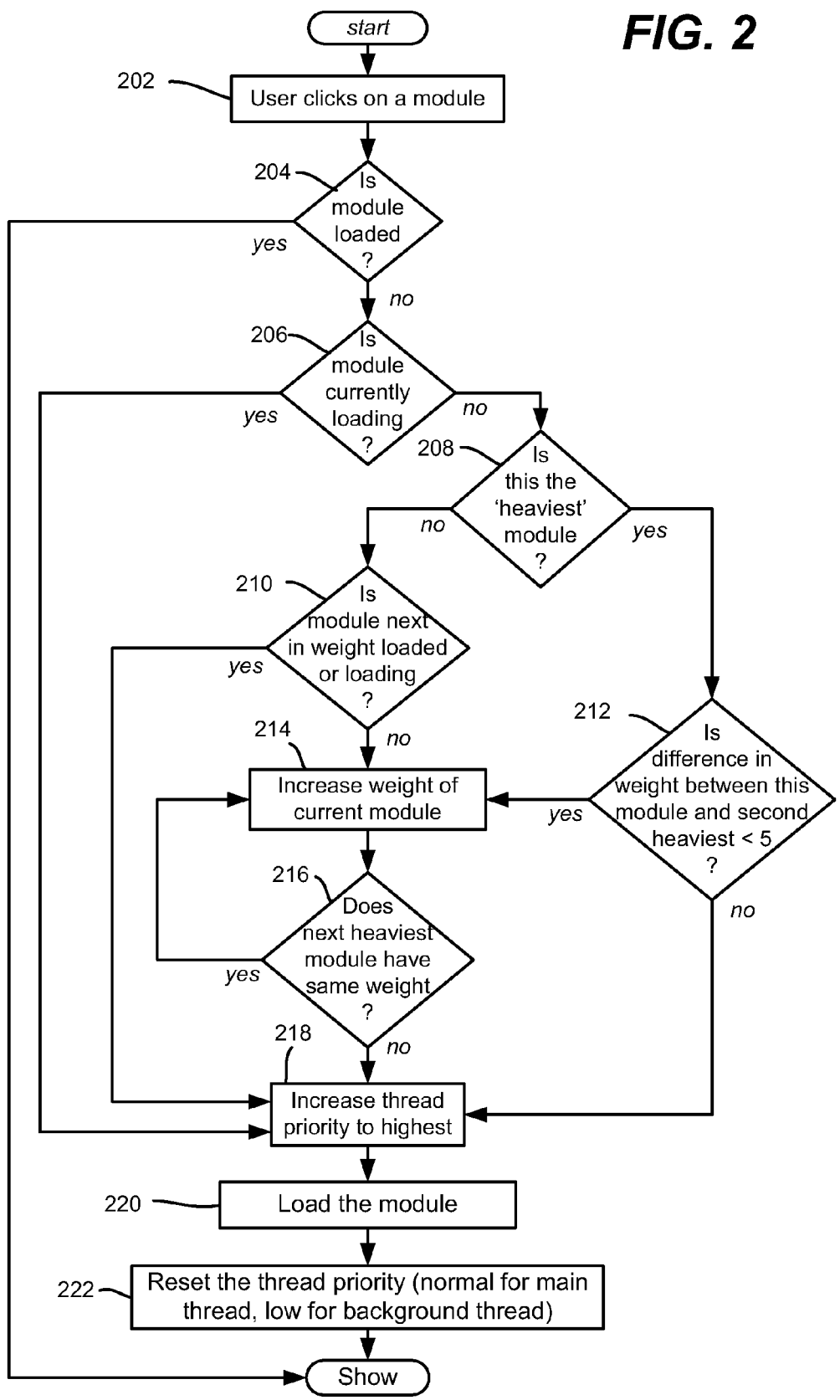
FIG. 2 is a flow diagram showing example steps with respect to loading a module based upon user interaction therewith, including adjusting weights and thread priorities.

FIG. 2 is a flow diagram showing how interaction with a module modifies the order in which modules are loaded, as well as how thread priority changes due to user interaction. Note that preloading begins according to the order that is based upon the historical data (priority weighting scheme) when available, and preloading is taking place (or may have completed) when FIG. 2 begins.

The steps of FIG. 2 begin at step 202 when a user clicks on (or otherwise interacts with) a module, e.g., an icon or the like representative of the module on the user interface. As this action indicates that the user wants to use the module, referred to herein as the "selected" module, the other steps are directed towards getting the selected module loaded if necessary, as well as adjusting its weight based upon the interaction.

Step 204 evaluates whether the selected module is already loaded. If so, that module is shown to the user. Note that although not shown in this example, anytime a module is selected but is already loaded, its weight may be increased, such as using the steps generally described below.

If not already loaded, step 206 evaluates whether the selected module is currently loading via the background thread. If so, step 206 branches to step 218 where the thread priority of the background thread that is loading the selected module is increased (e.g., to the highest priority, high), so that the selected module will load as fast as possible, and also will not be blocked by other operations. Note that when the user clicks on a module name, the UI blocks until the module is loaded. Because preloading takes time, this results in a scenario where the user is able to click on a module that is not yet loaded. To facilitate loading, loading first starts on a background thread, which allows the user to navigate to another module while loading a module in the background.

Step 220 loads the selected module. When loaded, step 222 resets the priority from high to a lesser priority that depends on whether the normal thread or background thread was the one being used for loading, e.g., the normal thread is returned to normal priority, or the background thread to low priority.

If the selected module is not yet loaded or currently being loaded, the next set of steps operate to adjust its weight to reflect the user interaction. In one implementation and in general, if the user interacts with and thus loads a module that is lower in priority before the module above it in priority is loaded (as evaluated at step 210), the loaded module has its priority weight increased (e.g., by one) at step 214. If at that point the module's priority number is same as the module having higher priority, the module's priority is again increased, (e.g., by one more) via step 216. This ensures that next time this module is loaded, it is higher in the priority list than the module that was previously above it.

However, in one implementation a weight is not allowed to get too high relative to other weights, so that, for example, a user is not stuck preloading a module first that was used many times in the past, but is no longer the most-frequently used module. To this end, as a cleanup mechanism, the logic ensures that no two priorities are separated by more than some maximum value, e.g., five. For example, if there are ten modules for a user and the lowest priority module is set to priority weight one, then the highest priority module cannot be higher than fifty-one. Note that the lowest priority module weight is always one (1). This thus maintains a scenario where recent user behavior is favored.

To this end, before step 210, step 208 determines whether the selected module is the heaviest module. If so, step 212 is executed to evaluate whether the selected module exceeds the maximum difference with respect to the module with the next heaviest weight, in which event its weight will not be increased further, that is, step 212 bypasses steps 214 and 216. Note that an additional or alternative cleanup mechanism can adjust the weights to comply with a desired maximum rule, e.g., a cleanup mechanism that operates just before flushing the weights back to the data store 114.

Figure 3:
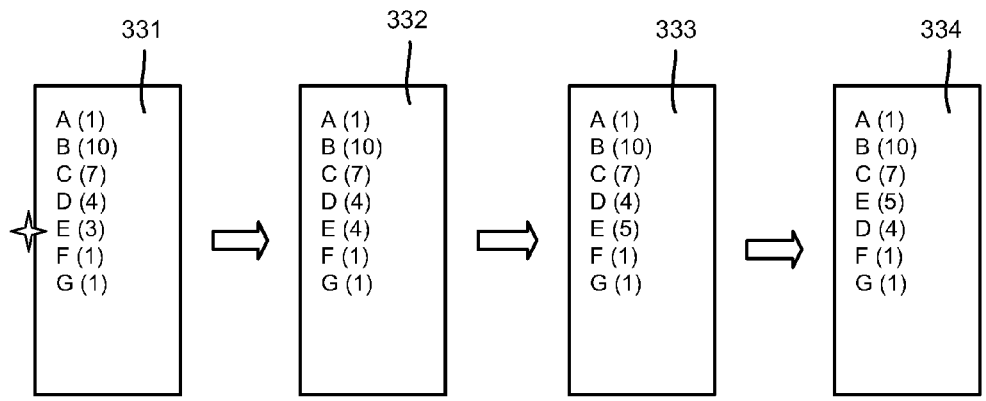
FIG. 3 is a representation of how a module's weight is adjusted in a priority scheme to reflect historical usage patterns.

In this manner, the selected module is loaded with a high priority thread level and its weight increased (up to a maximum) to reflect the user interaction with the module. FIG. 3 is an example of how weights are adjusted.

As represented in FIG. 3, boxes 331-334 show priority weight values for modules A, B, C, D, E, F and G over time as a user interacts with those modules. The star in the first box indicates where the user clicked, that is, module E is the selected module. As can be seen, E's priority weight gets changed to four (4) (from box 331 to 332) because D, higher up on the priority list, is not yet loaded. Further, because E's priority weight is now the same as D's weight, and D is positioned higher in the priority list, E's priority weight gets increased up to five (5) in box 333. Box 334 shows the list after rearranging E and D based upon priority.

Figure 4:
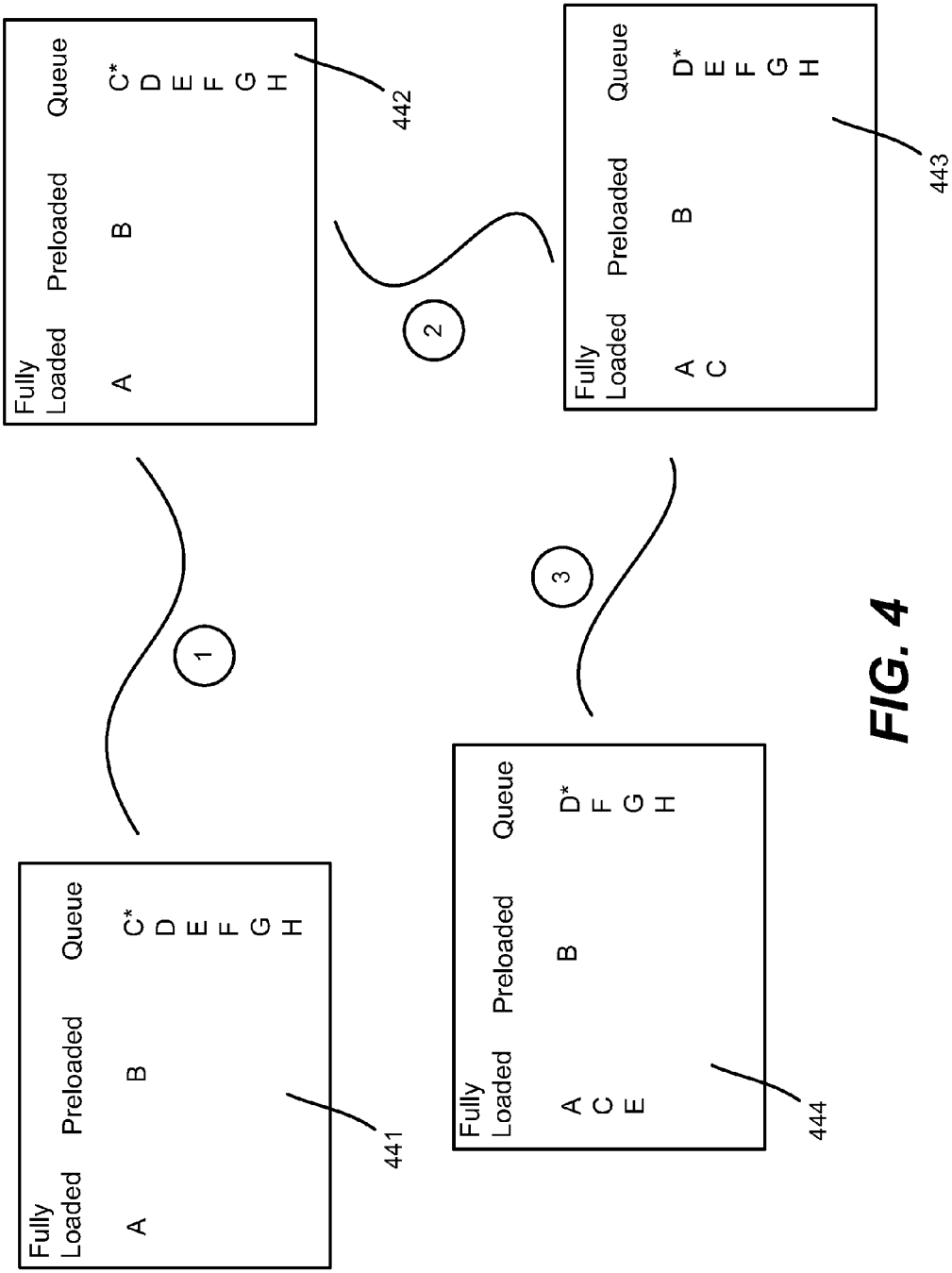
FIG. 4 is a representation of how modules are loaded and threads change priority when preloading and loading based upon user interaction with the modules.

FIG. 4 represents a sequence of events (represented via boxes 441-444) that take place with respect to thread priorities; note that the asterisk (*) indicates the module is being preloaded. At box 441, the User clicks module C, whereby the thread priority of the thread loading the selected module C is increased to high (circled numeral one (1)) for loading C (box 442). When C finishes loading, C moves (circled numeral two (2)) to the list of fully loaded modules (box 443), and the thread priority is restored to low for loading the next module in the queue, module D. If during the loading of D the user then user clicks E, E is loaded by the normal thread and moved (circled numeral three (3)) from the queue to the fully loaded list (box 444). Preloading continues with the low priority preloading thread.

Turning to another aspect, once fully loaded any module or modules may be rendered in off-screen memory such that they are hidden from the user. When the user clicks on the module name, the user interface moves the module into view (on-screen memory), thus rapidly displaying a module's rendering. Note that fully loading implies loading the binary and initializing some parts of the module, e.g., by gathering module initialization parameters so the module can download relevant patient data.

Exemplary Operating Environment

Figure 5:
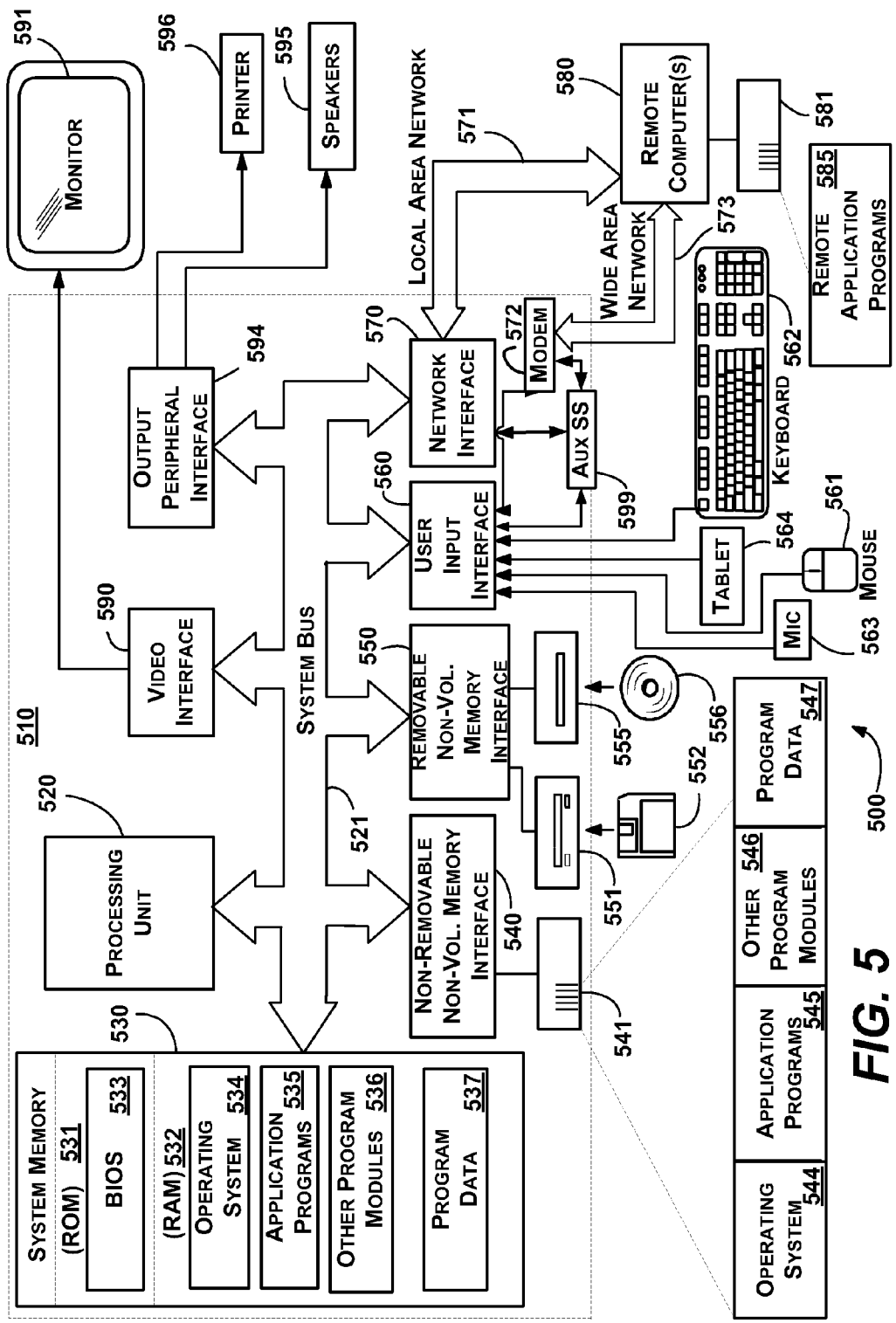
FIG. 5 shows an illustrative example of a computing environment into which various aspects of the present invention may be incorporated.

FIG. 5 illustrates an example of a suitable computing and networking environment 500 into which the examples and implementations of any of FIGS. 1-4 may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component 574 such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
   determining, by one or more processors, which subset of modules a user is authenticated to use with respect to a set of available modules;
   determining an order for loading the subset of modules based upon historical data for that user; and
   loading the subset of modules based at least in part on the order.

2. The method of claim 1 further comprising:
   loading data for at least one of the modules.

3. The method of claim 1 further comprising:
   detecting user interaction with a representation of a selected module that is not yet loaded; and
   loading the selected module independent of the order.

4. The method of claim 3 wherein the selected module is currently being loaded by a background thread, and further comprising, increasing a thread priority of the background thread.

5. The method of claim 3 wherein the selected module is currently not being loaded by a background thread, and wherein loading the selected module comprises increasing a thread priority of a normal thread and using the normal thread to load the selected module.

6. The method of claim 3 wherein loading the selected module includes increasing a thread priority for a thread that loads the selected module.

7. The method of claim 6 further comprising, restoring the thread priority after the selected module is loaded.

8. The method of claim 1 wherein the historical data comprises a plurality of weight values, with one weight value associated with each module of the subset of modules, and further comprising, detecting user interaction with a representation of a selected module, and adjusting the weight value associated with that selected module based upon the interaction.

9. The method of claim 8 further comprising, detecting whether the weight value after adjusting equals a weight value associated with another module, and if so, further adjusting the weight value of the selected module.

10. The method of claim 8 wherein determining the order comprises sorting the subset by the weight values associated with the modules into a sorted list.

11. The method of claim 10 further comprising:
taking action to ensure that no two weight values of two modules that are adjacent in the sorted list exceeds a maximum difference.

12. The method of claim 1 further comprising:
rendering a first representation of a loaded module to on on-screen memory such that the first representation is displayed; and
rendering a second representation of another loaded module to an off-screen memory such that copying the off-screen memory to the on-screen memory displays the second representation.

13. In a computing environment, a system comprising:
one or more processors;
a module loading mechanism implemented on the one or more processors and configured to load modules, the module loading mechanism further configured to determine which subset of modules a user is authenticated to use with respect to a set of available modules and to access historical data corresponding to previous module usage to determine an order for loading the subset of modules, the module loading mechanism configured to run a background thread to load the subset of modules according to the order, and further configured to detect an intent to use a selected module from the subset of modules, and if so, to load the selected module with another thread if not already loaded or not currently being loaded via the background thread.

14. The system of claim 13 wherein the selected module is not already loaded and is not currently being loaded via the background thread, wherein the other thread comprises a normal thread, and wherein the module loading mechanism is configured to increase the thread priority of the normal thread to load the selected module, and to restore the thread priority of the normal thread after the selected module is loaded.

15. The system of claim 13 wherein the selected module is currently being loaded via the background thread, and wherein the module loading mechanism is configured to increase the thread priority of the background thread to continue loading the selected module, and to restore the thread priority of the background thread after the selected module is loaded.

16. The system of claim 13 wherein the modules include at least one module for interacting with clinical data, and wherein the module loading mechanism is further configured to determine which modules to load from a larger set of available modules based upon which user has authenticated with the system.

17. The system of claim 13 wherein the historical data comprises a weight value associated with each module, in which the weight value for a given module corresponds to usage of that module.

18. One or more tangible computer storage devices having computer-executable instructions, which in response to execution by a computer, cause the computer to perform steps, comprising:
determining which subset of modules a user is authenticated to use with respect to a set of available modules;
loading the subset of modules via a background thread;
detecting interaction that indicates a selected module from the subset of modules; and
loading the selected module via another thread.

19. The one or more tangible computer storage devices of claim 18 having further computer-executable instructions comprising:
determining an order for loading the modules via the background thread based upon historical usage information associated with each module.

20. The one or more tangible computer storage devices of claim 19 having further computer-executable instructions comprising:
adjusting the historical usage information of the selected thread as a result of the interaction.

* * * * *